United States Patent
Degner et al.

(10) Patent No.: US 6,777,904 B1
(45) Date of Patent: Aug. 17, 2004

(54) METHOD AND SYSTEM FOR CONTROLLING A MOTOR

(75) Inventors: Michael W. Degner, Novi, MI (US); John Robert Grabowski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,854

(22) Filed: Feb. 25, 2003

(51) Int. Cl.$^7$ ................................................ G05B 11/36
(52) U.S. Cl. ...................... 318/609; 318/268; 318/432; 318/568.16; 318/625; 388/802
(58) Field of Search .................... 318/609, 432, 318/625, 600, 611, 568.16, 630, 568.1, 568.11, 561, 615, 815, 632; 388/809, 802, 813, 814, 815

(56) References Cited

U.S. PATENT DOCUMENTS

| | | | |
|---|---|---|---|
| 4,821,190 A | * | 4/1989 | Patil ............................ 701/68 |
| 5,646,495 A | * | 7/1997 | Toyozawa et al. .......... 318/625 |
| 5,691,615 A | * | 11/1997 | Kato et al. ................... 318/609 |
| 5,865,263 A | | 2/1999 | Yamaguchi et al. |
| 6,054,844 A | | 4/2000 | Frank |
| 6,233,508 B1 | | 5/2001 | Deguchi et al. |
| 6,364,807 B1 | | 4/2002 | Koneda et al. |
| 6,394,208 B1 | | 5/2002 | Hampo et al. |

* cited by examiner

Primary Examiner—Karen Masih
(74) Attorney, Agent, or Firm—Brooks Kushman, P.C.; Carlos Hanze

(57) ABSTRACT

A method of transitioning a motor from a torque control mode to a speed control mode includes providing the motor with a torque command to eliminate torque holes at the transition. A speed controller generates a speed error, which is used to generate two torque terms. The first torque term is proportional to the speed error, and the second torque term includes the integral of the speed error. A third torque term comprises a feedforward torque, which is added to the first two torque terms to generate the torque command.

23 Claims, 3 Drawing Sheets

METHOD AND SYSTEM FOR CONTROLLING A MOTOR

BACKGROUND OF INVENTION

1. Field of the Invention

The present invention relates to a method and system for controlling a motor.

2. Background Art

Electric motors may be operated in any one of a number of different operating modes—e.g., torque control and speed control. The optimum mode of operation may depend on many factors, including the application in which the motor is being used, and the particular motor requirements when the motor is being run. One difference between a torque control mode and a speed control mode is the desired output of the motor. For example, when operating in a torque control mode, a motor controller may send a signal or signals to the motor to control the torque to achieve a desired motor torque. Conversely, when a motor is being operated in a speed control mode, the goal is a desired motor speed. Thus, even though the motor controller may still control the torque of the motor, the torque is controlled to achieve a desired motor speed.

Electric motors have many different applications, including use in electric vehicles and hybrid electric vehicles (HEVs). In electric vehicles and HEVs, the ride quality is directly related to the electric drive system's ability to produce a smooth, continuous torque. For these vehicles to perform just as their "engine only" counterparts would, the electric motor must be operated in several different modes. These different modes will typically complicate the system control and thus require additional effort to offset their complexities. In HEVs, a vehicle system controller (VSC) is usually present to manage system functions and to interface with a traction drive system. A traction drive system may include the electric motor, a motor controller, and power electronics. The motor controller, which may include a speed controller, controls the motor through the power electronics, which manipulates magnetic fields within the motor to control the motor torque.

At a basic level, the electric motor is operated in the torque control mode; however, in many instances, the best vehicle performance requires that the motor be operated in the speed control mode. Transitioning the motor from one mode of operation to another can cause problems in powertrain performance. For example, as a motor is transitioned from torque control to speed control, the vehicle system controller provides a speed command, or target speed, to the motor controller. The target speed is then compared to the present motor speed, the difference between the two being a speed error. If this target speed is at or below the present motor speed, the speed error is zero or negative, and this momentarily sets the motor's output torque to zero (or even a negative torque) as soon as the motor is transitioned into speed control. This situation is transient however, and as the motor decelerates, the speed error becomes positive and the torque of the motor begins to increase. This recovery takes time, and even if the system responds quickly to increase the torque after the motor decelerates, the initial drop in torque may cause the vehicle to experience a brief, sudden deceleration. In fact, an undesired "torque hole" may occur each time the operating mode is changed from torque control to speed control.

An example of where an electric motor in a vehicle may change from torque control to speed control is seen in the operation of an HEV. If the HEV is operating solely under the power of the electric motor, and the electric motor is operating in the torque control mode, the need to start the internal combustion engine may necessitate transitioning the motor from torque control mode to speed control mode. Thus, while the speed controller initializes, the potential for a torque hole would exist. Another example of where a motor in a motor driven vehicle may need to be transitioned from torque control to speed control is during the acceleration of the vehicle when a gear change is required. The gear change may force a rapid transition into speed control mode to aid in a smooth shift. This frequent switching from one mode to another is required for optimal vehicle performance, but also means that special attention must be paid to the transitions.

Accordingly, it is desirable to provide a method and system for transitioning an electric motor between two operating modes, such that the transitions may occur as frequently as needed to optimize vehicle performance, while eliminating undesired degradation in powertrain performance caused by a sudden drop in motor torque.

SUMMARY OF INVENTION

Therefore, a method of transitioning an electric motor from a first operating mode to a second operating mode is provided. The method comprises measuring the speed of the motor and generating a second torque command. The second torque command may be a function of the measured motor speed, a first torque command, and a motor speed command. The second torque command is sent to the motor, and it is modified when the measured motor speed reaches a predetermined value.

The invention further provides a method of transitioning an electric motor from a first operating mode to a second operating mode. The method comprises measuring the speed of the motor and generating a speed error. The speed error is the difference between a motor speed command and the measured motor speed. A second torque command is also generated. The second torque command may be a function of the speed error, an integral of the speed error, and a first torque command. The second torque command is sent to the motor, and it is modified when the measured motor speed reaches a predetermined value.

The invention also provides a system for transitioning an electric motor from a first operating mode to a second operating mode. The system comprises a first controller for at least controlling the motor. The first controller is configured to at least receive a measured motor speed, receive a first torque command, and receive a motor speed command. The first controller is also configured to generate a second torque command, the second motor torque being a function of the measured motor speed, the first motor torque, and the motor speed command. The first controller is also configured to output a second torque command.

The invention further provides a controller for controlling an electric motor. The controller comprises an algorithm for generating a second torque command and for sending the second torque command to the motor. The second torque command may be a function of a measured motor speed, a motor speed command, and a first torque command.

The above object and other objects, features, and advantages of the present invention are readily apparent from the following detailed description of the best modes for carrying out the invention when taken in connection with the accompanying drawings.

DETAILED DESCRIPTION

Figure 1:
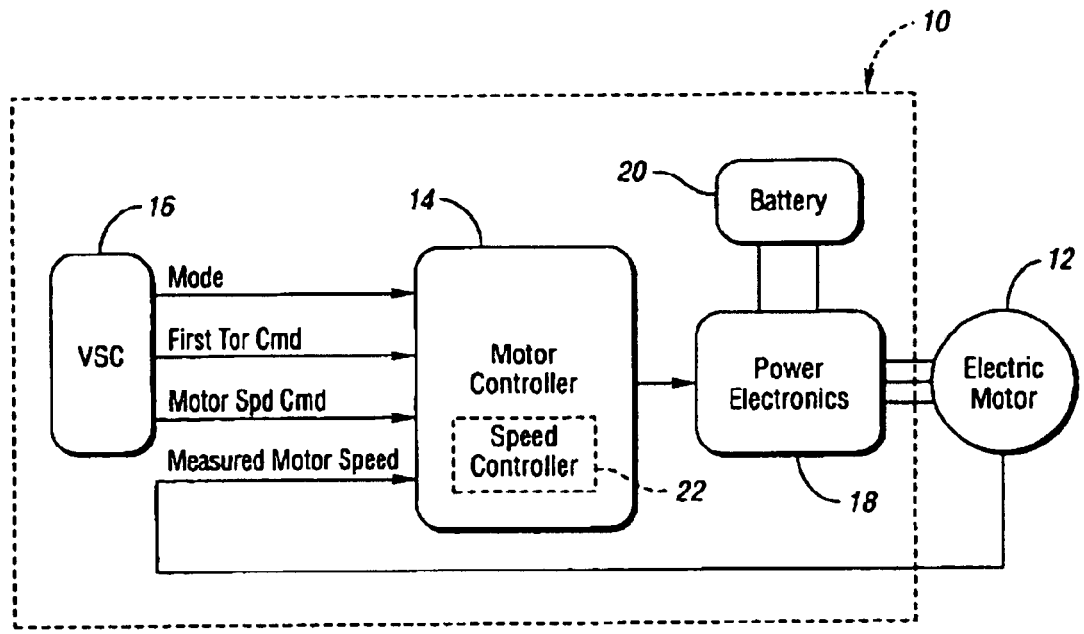
FIG. 1 is a simple schematic diagram illustrating a system in accordance with the present invention, the system being used to control an electric motor.

FIG. 1 is a simple schematic diagram of a system 10 used to control an electric motor 12 in a vehicle. The vehicle may be an electric or hybrid electric vehicle. By way of example and not limitation, a hybrid electric vehicle may be a gasoline or diesel hybrid electric vehicle, or a fuel cell hybrid electric vehicle. The system 10 includes a first controller, or motor controller 14, a second controller, or vehicle system controller 16, an electronic subsystem, or power electronics 18, and a battery 20. The motor controller 14 includes a speed controller 22 which, as explained in detail below, is configured to facilitate a smooth transition of the electric motor 12 between operating modes. As readily seen in FIG. 1, the various components interact with one another to provide inputs and outputs that help to control the motor 12.

As an example of this interaction, the motor controller 14 may receive a number of inputs from the VSC 16, such as a first torque command, a motor speed command, and a signal that commands the mode of operation for the motor 12—e.g., speed control mode or torque control mode. In addition, the motor controller may receive an input from a sensor (not shown) on the electric motor 12 that indicates a measured motor speed. The motor controller 14, and more specifically the speed controller 22, may provide output signals to the power electronics 18 based on the various inputs received. The power electronics 18 are configured to receive inputs from the motor controller 14, and to control magnetic fields within the motor 12 to achieve a desired result, for example, a desired motor torque or a desired motor speed. The battery 20 provides power for the system, and may be recharged by any suitable method, including those commonly used in the field of electric vehicles and HEVs.

In the embodiment shown in FIG. 1, the speed controller 22 is not a physical structure, but rather represents a preprogrammed algorithm within the motor controller 14. It is possible, however, that a motor controller, such as the motor controller 14, could be attached to, or provided with, additional electronic components that perform the function of the speed controller 22. Because the speed controller 22 is an algorithm within the motor controller 14, it is assumed that inputs into the motor controller 14 may also be inputs into the speed controller 22. Similarly, outputs from the speed controller 22 may also be outputs of the motor controller 14.

Figure 2:
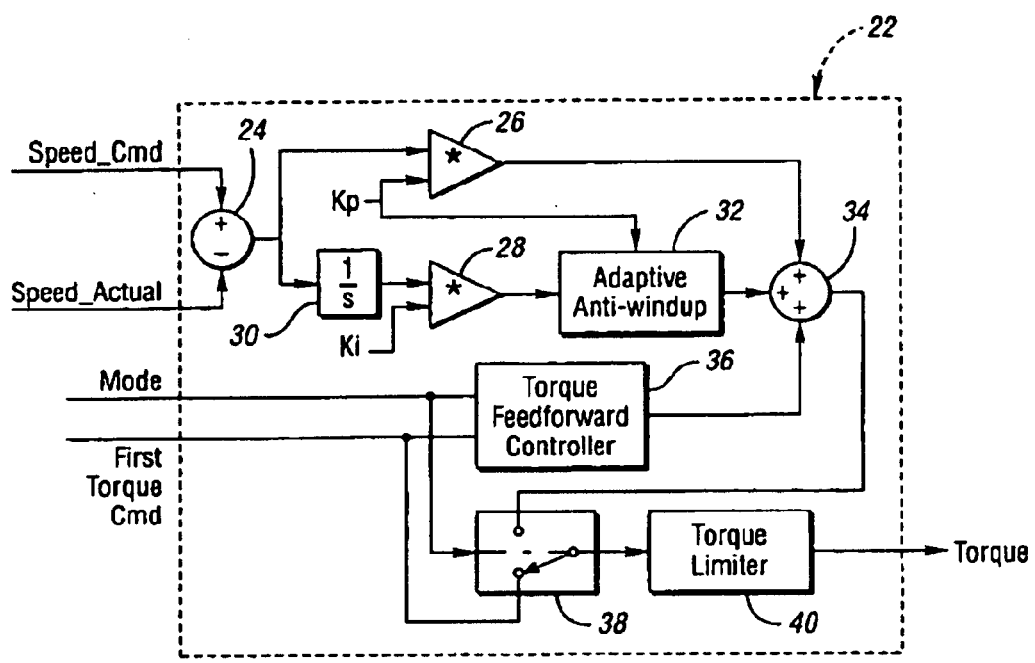
FIG. 2 is a control circuit illustrating a speed controller used in the system illustrated in FIG. 1.

FIG. 2 illustrates a detail of the speed controller 22 and its operation. The speed controller 22 is configured to handle motor operating mode transitions in an improved manner. Specifically, the speed controller 22 is configured to minimize the torque perturbations and eliminate the resulting vehicular disturbances. At the outset, the speed controller 22 receives a speed command and an actual motor speed into a summing junction 24. The speed command, or motor speed command, represents a desired motor speed sent to the speed controller 22 by the VSC 16. The VSC 16 may generate the speed command according to is own preprogrammed algorithms, or it may be provided to the speed controller 22 from other subsystems within the vehicle.

The actual speed is provided to the speed controller 22, and in particular into the summing junction 24, from the speed sensor on the electric motor 12. Hence, the "actual speed" is the measured motor speed. At the summing junction 24, the difference between the speed command and the actual speed is calculated, thereby generating a speed error. The speed error is output from the summing junction 24 into two separate gain blocks 26, 28. At the gain block 26, a multiplier, or gain Kp, is applied to the speed error. This is a first torque term that will be used later in the algorithm. Prior to the speed error reaching the gain block 28, it is integrated at an integration block 30. At the gain block 28, a gain Ki is applied to the integral of the speed error, to generate a second torque term.

Included in the speed controller 22 is an adaptive anti-windup function, or adaptive anti-windup strategy 32. The adaptive anti-windup strategy 32 can greatly improve the ability of the speed controller 22 to quickly regain speed control tracking following a mode change transient. Specifically, the adaptive anti-windup strategy 32 resets the integrator, represented by the integration block 30, each time a mode transition occurs. This ensures that previously integrated values will not be carried into future speed control calculations. This illustrates another benefit of the present invention, for without the adaptive anti-windup strategy 32, the integrated value of the speed error could increase to the point where it dominated the output of the speed controller 22. In addition, the adaptive anti-windup strategy 32 prohibits the integrator from functioning during periods when a large speed error exists. As explained more fully below, this feature allows the use of much larger integral gains, such as the integral gain Ki, since these gains will only be applied when the speed errors are small.

After the gain Kp is applied to the speed error, and the gain Ki is applied to the integral of the speed error, the terms are summed at a summing junction 34. In addition, a third torque term is added at the summing junction 34. Specifically, a first torque command, or feedforward torque, is output from a torque feedforward controller 36. The torque feedforward controller 36 receives a mode signal and the first torque command from the VSC 16. The mode signal tells the torque feedforward controller 36 the operating mode of the motor 12.

The torque feedforward controller 36 may use the first torque command in one of a number of ways. For example, if the mode command indicates to the torque feedforward controller 36 that the motor 12 is in the speed control mode, the torque feedforward controller 36 will output the first torque command, or feedforward torque, to the summing junction 34. Here, the feedforward torque, or third torque term, is added to the first and second torque terms. The sum of these three terms represents a second torque command which is then output to a switch 38.

In addition to receiving the second torque command via the summing junction 34, the switch 38 also receives the first torque command and the mode command from the VSC 16. Based on the mode command, the switch 38 allows either the first or second torque command to pass through to a torque limiter 40. When the mode command indicates that the motor 12 is in the torque control mode (as shown in FIG. 2), the first torque command passes through the switch 38 to the torque limiter 40. When the motor 12 is in the speed control mode, the switch 38 allows the second torque command, including all three torque terms, to pass through to the torque limiter 40. It is worth noting that the switch 38, like the other components in the speed controller 22, is not a physical device; rather, it is part of the preprogrammed algorithm that makes up the speed controller 22. Of course, the speed controller 22 may comprise physical devices that perform the function of one or more of the components shown in FIG. 2.

The torque limiter 40 is included in the speed controller 22 because of the finite torque production capacity of the motor 12. Thus, if the torque command input into the torque limiter 40 is larger than the torque that can be produced by the motor 12, the torque command is limited to a predetermined torque value. This limit is polarity sensitive such that when the torque command is positive, the predetermined torque value will be a maximum torque. Conversely, when the torque command is negative, the predetermined torque value will be a minimum torque. After being appropriately limited with the torque limiter 40, the torque command is sent to the motor 12 through the power electronics 18.

Figure 3:
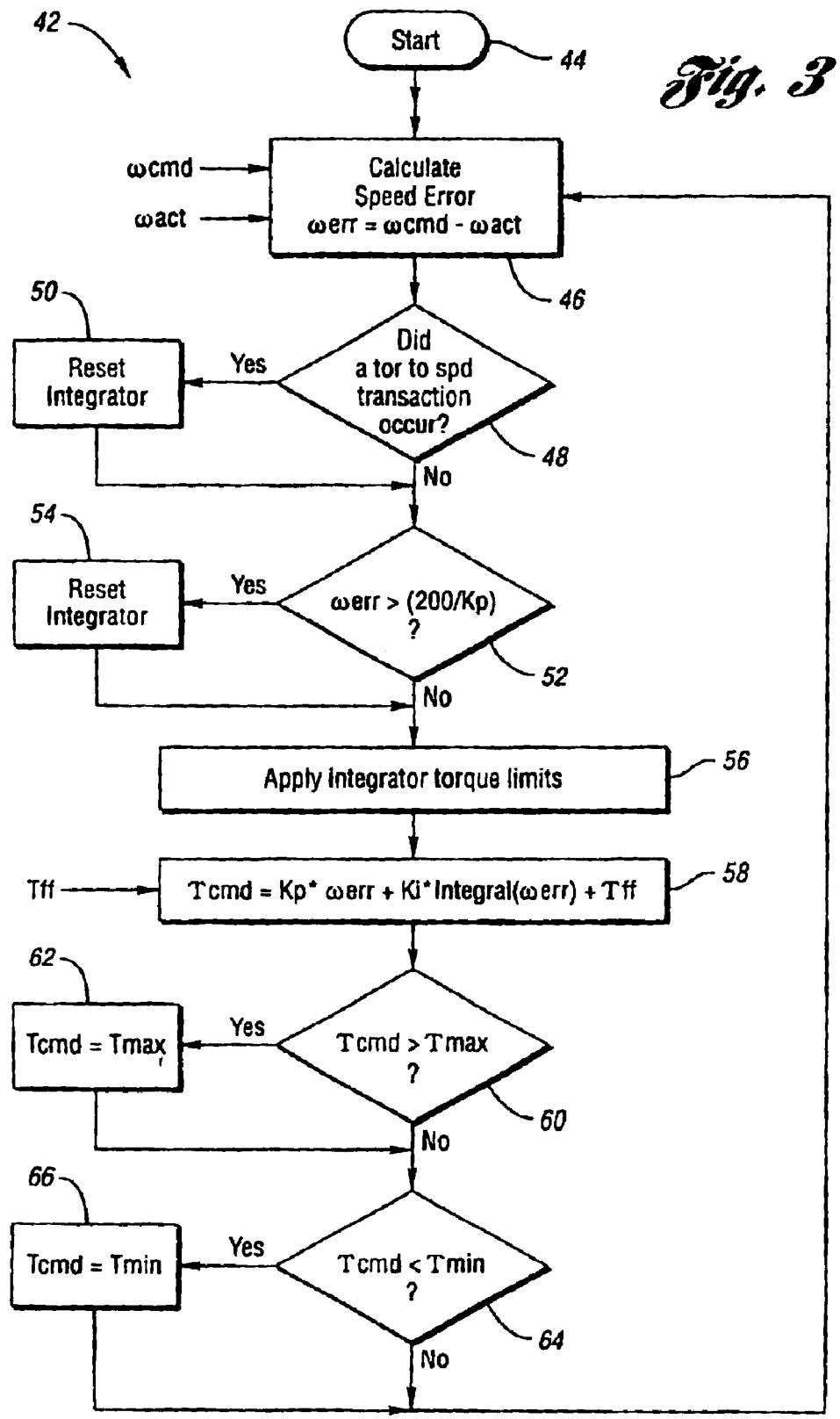
FIG. 3 is a flowchart illustrating a method in accordance with the present invention.

FIG. 3 is a flowchart 42 illustrating a method of transitioning the electric motor 12 from torque control mode to speed control mode. It is worth noting that the transition from torque control mode to speed control mode is used as an example because it is known that torque perturbations and vehicular disturbances can occur during such a transition. However, the system 10, and in particular the speed controller 22, can be used to help smooth transitions between other operating modes—e.g., from a speed control mode to a torque control mode.

Returning to FIG. 3, it is seen that the transition begins with a start command, represented by oval 44. The start command may come from the VSC 16 via the mode signal which is fed into the motor controller 14 and into the speed controller 22 (see FIG. 2). The speed controller 22 also receives a motor speed command and an actual, or measured, motor speed, and then generates a speed error term from their difference (see block 46). After the speed error term is calculated, it is determined whether a torque-to-speed transition occurred; this is illustrated in decision block 48. If the transition did occur, the integrator within the speed controller 22 is reset in accordance with the adaptive anti-windup strategy 32.

If the integrator is reset, as illustrated in block 50, or if a torque-to-speed transition did not occur, the speed error is sent to decision block 52. In decision block 52 it is determined whether or not the speed error is greater than the quantity (200/Kp). As briefly explained above, this inquiry is part of the adaptive anti-windup strategy 32 that prohibits the integrator from functioning during periods when a large speed error exists.

In the embodiment illustrated in FIG. 3, the magnitude threshold of the speed error is set by the quantity (200/Kp). The number 200 is a calibrated constant, chosen for optimum performance. As discussed above, the term "Kp" is the controller's proportional gain. The value of Kp, and the calibrated constant 200, are chosen based on optimizing a system, such as the system 10. Thus, one or both of these values may change when the method is applied to a different system, or when a given system changes. For example, if the quantity (200/Kp) is optimal for a given system, and the electric motor is replaced, either or both of the terms in the quantity (200/Kp) may need to be changed. Similarly, a change in a component that affects vehicle performance—e.g., tires—may also necessitate a change in the quantity (200/Kp).

Comparing the speed error to a limiting quantity, such as the quantity (200/Kp), is a feature of the adaptive anti-windup strategy that helps to prevent the integrator from winding up during situations where large speed errors exist. This may be important, since the integrator is most effective for correcting errors during steady-state performance. In addition, this feature also allows the use of much larger integral gains, such as Ki, because this limiting feature helps to ensure that the gains will only be applied when the speed errors are small. Using a larger integral gain can provide an overall benefit, since a larger gain increases the signal bandwidth and provides greater control of the motor.

Returning to FIG. 3, it is seen that if the speed error is greater than the quantity (200/Kp), the integrator is reset as illustrated in block 54. If the integrator is reset, or if the speed error is less than or equal to the quantity (200/Kp), a torque limit is applied to the integrated value (see block 56). Because a motor, such as the motor 12, has a finite torque capacity, a torque command must be limited such that it remains within this torque capacity. In addition, the second torque command contains a feedforward torque term, as discussed above in conjunction with FIG. 2, and so the integrated torque term must be limited as illustrated in block 56, so that the second torque command, including the feedforward torque, does not exceed the torque capacity of the motor 12.

After the torque limits have been applied to the integrator, the second torque command is generated as illustrated in block 58. The feedforward torque, or first torque command, after being output from the torque feedforward controller 36 (see FIG. 2), is added to the other two torque terms to generate the second torque command. This is illustrated in block 58 in FIG. 3. Finally, an absolute torque limiter function is applied so that the value of the second torque command does not exceed the torque capacity of the motor 12. The absolute torque limiting function is shown as torque limiter 40 in FIG. 2, and is represented in blocks 60, 62, 64, and 66 in FIG. 3. Once the second torque command is appropriately limited, it is sent to the motor 12 and fed back into the speed controller 22.

The second torque command is delivered to the motor 12 until the motor speed reaches a predetermined level. The predetermined level may be chosen to be slightly above the motor speed command. This helps to ensure that the motor has reached its target speed and that the mode transition is complete, before the second motor torque is modified. Once the motor speed reaches the predetermined level—i.e., exceeds the motor speed command—the second torque command is reduced. This may involve a reduction in the third torque term, or first torque command, such that the first and second torque terms predominate the second torque command. The motor speed is then controlled as the motor operates in speed control mode.

Figure 4:
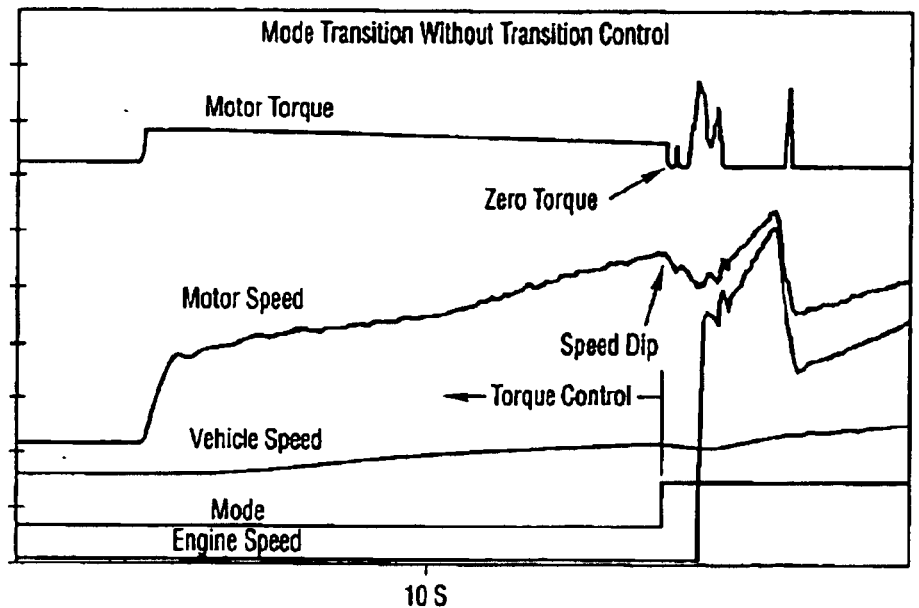
FIG. 4 is line graph illustrating motor speed and motor torque profiles as a motor undergoes a transition from torque control to speed control.
Figure 5:
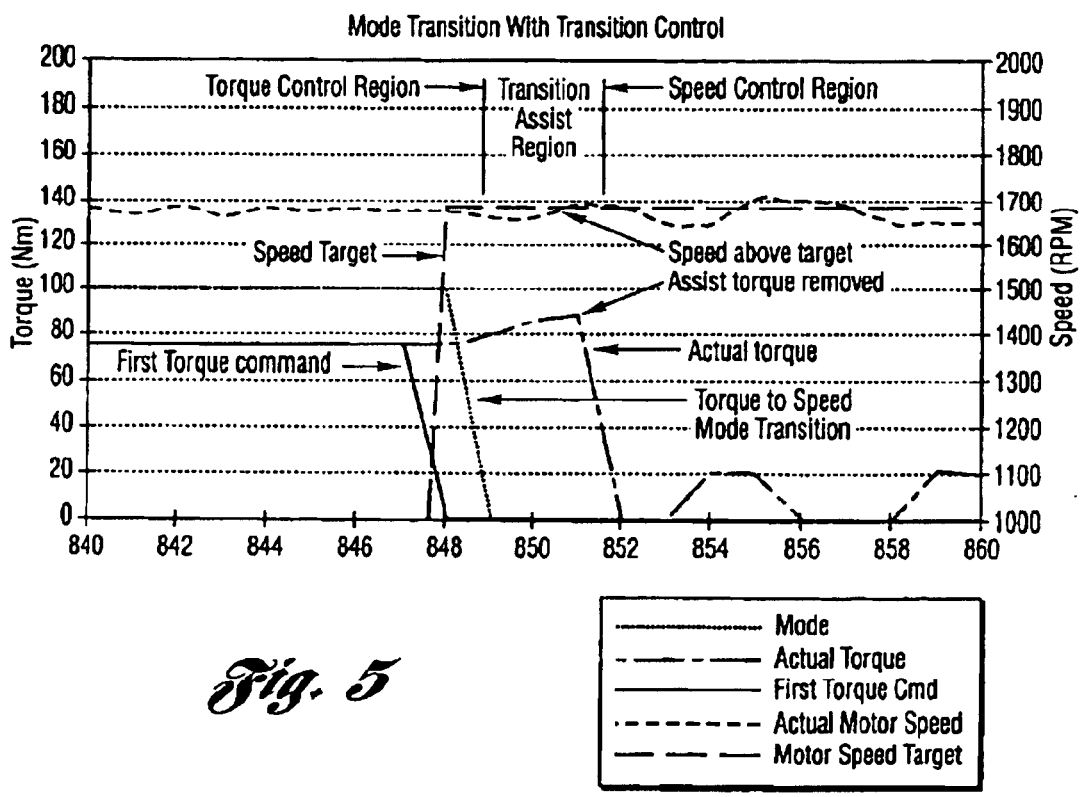
FIG. 5 is a line graph illustrating motor speed and motor torque profiles for an electric motor undergoing a transition from torque control to speed control, the electric motor having the benefit of the system and method of the present invention.

An examination of FIGS. 4 and 5 clearly illustrates some of the benefits of the present invention. FIG. 4 shows a motor torque and motor speed profile for an electric motor in an HEV as it undergoes a transition from torque control to speed control. The line representing the operating mode is initially in torque control mode until it moves vertically up the graph and transitions into speed control mode. Without the use of the method and system of the present invention, the speed profile and torque profile both undergo noticeable dips at this operating mode transition. In fact, the motor torque drops to zero for a short time, indicating a zero or negative speed error. It is at this point that this torque perturbation results in a noticeable vehicular disturbance.

In contrast, FIG. 5 illustrates a similar transition from a torque control mode to a speed control mode utilizing the transition control described in the method and system of the present invention. In FIG. 5 it is seen that the actual torque increases slightly during the transition period, while the motor speed remains nearly constant. This is because of the addition of the second torque command, including the feedforward torque, which ensures that the motor torque will not drop to zero. Once the motor speed is slightly above the speed target, or motor speed command, the second torque command is modified such that the feedforward torque term is reduced. This is illustrated in FIG. 5 at the point where the assist torque is removed. The speed of the motor is then modulated in a speed control mode to maintain tight speed control.

While the best mode for carrying out the invention has been described in detail, those familiar with the art to which this invention relates will recognize various alternative designs and embodiments for practicing the invention as defined by the following claims.

What is claimed is:

1. A method of transitioning an electric motor from a first operating mode to a second operating mode, the method comprising:

measuring the speed of the motor;

generating a second torque command, the second torque command being a function of the measured motor speed, a first torque command, and a motor speed command;

sending the second torque command to the motor; and modifying the second torque command when the measured motor speed reaches a predetermined value.

2. The method of claim 1, wherein the first operating mode includes a torque control mode and the second operating mode includes a speed control mode.

3. The method of claim 1, further comprising generating a speed error, the speed error being the difference between the motor speed command and the measured motor speed.

4. The method of claim 3, wherein the second torque command is a function of a first torque term, a second torque term, and a third torque term, the first torque term including the speed error, the second torque term including an integral of the speed error, and the third torque term including the first torque command.

5. The method of claim 4, further comprising using an adaptive anti-windup function to limit the size of the speed error integral.

6. The method of claim 4, wherein the second torque command is modified when the measured motor speed exceeds the motor speed command.

7. The method of claim 6, wherein the second torque command is modified by reducing the third torque term.

8. The method of claim 1, further comprising an absolute torque limiter function for limiting the second torque command prior to sending the second torque command to the motor.

9. A method of transitioning an electric motor from a first operating mode to a second operating mode, the method comprising:

measuring the speed of the motor;

generating a speed error, the speed error being the difference between a motor speed command and the measured motor speed;

generating a second torque command, the second torque command being a function of the speed error, an integral of the speed error, and a first torque command;

sending the second torque command to the motor; and modifying the second torque command when the measured motor speed reaches a predetermined value.

10. The method of claim 9, further comprising limiting the speed error integral with an adaptive anti-windup function.

11. The method of claim 9, further comprising comparing the second torque command to a predetermined value.

12. The method of claim 11, wherein the predetermined value is used to limit the second torque command prior to sending the second torque command to the motor.

13. The method of claim 12, wherein the predetermined value is a maximum motor torque when the second torque command is positive, and the predetermined value is a minimum motor torque when the second torque command is negative.

14. The method of claim 9, wherein the second torque command is modified when the measured motor speed exceeds the motor speed command.

15. A system for transitioning an electric motor from a first operating mode to a second operating mode, the system comprising:

a first controller for at least controlling the motor, the first controller being configured to at least generate a speed error, an integral of the speed error, and a second torque command, the speed error being the difference between a motor speed command and a measured motor speed, the second torque command being a function of the speed error and a first toque command, the first controller being further configured with an adaptive anti-windup strategy for limiting the size of the speed error integral.

16. The system of claim 15, further comprising a second controller, the second controller being configured to at least send the first torque command and the motor speed command to the first controller.

17. The system of claim 15, wherein the first controller is further configured to generate a first torque term, a second torque term, and a third torque term, the first torque term including the speed error, the second torque term including the integral of the speed error, and the third torque term including the first torque command.

18. The system of claim 17, wherein the second torque command is a function of the first torque term, the second torque term, and the third torque term.

19. The system of claim 15, further comprising an electronics subsystem, the electronics subsystem being configured to at least receive the second torque command from the first controller, and to control magnetic fields within the motor.

20. A controller for controlling an electric motor, the controller comprising:

an algorithm for generating a second torque command and for sending the second torque command to the motor, the second torque command being a function of a speed error, an integral of the speed error, and a first torque command, the algorithm including an adaptive anti-windup strategy for limiting the size of the speed error integral.

21. The controller of claim 20, wherein the second torque command includes a first torque term, a second torque term, and a third torque term, the first torque term including a speed error calculated from the measured motor speed and the motor speed command, the second torque term including an integral of the speed error, and the third torque command including the first torque command.

22. A vehicle having an electric motor and a system for transitioning the motor from a first operating mode to a second operating mode, the system comprising:

a first controller for at least controlling the motor, the first controller being configured to at least generate a speed error, an integral of the speed error, and a second torque command, the speed error being the difference between a motor speed command and a measured motor speed, the second torque command being a function of the speed error and a first torque command, the first controller being further configured with an adaptive anti-windup strategy for limiting the size of the speed error integral.

23. The vehicle of claim 22, wherein the system further comprises a second controller, the second controller being configured to at least send the first torque command and the motor speed command to the first controller.

* * * * *